United States Patent [19]
Eidsvig

[11] Patent Number: 5,924,893
[45] Date of Patent: Jul. 20, 1999

[54] APPLIANCE INLET

[75] Inventor: Terje Eidsvig, Oslo, Norway

[73] Assignee: Defa A.S, Nesbyen, Norway

[21] Appl. No.: 08/945,638

[22] PCT Filed: May 8, 1996

[86] PCT No.: PCT/NO96/00112

§ 371 Date: Oct. 31, 1997

§ 102(e) Date: Oct. 31, 1997

[87] PCT Pub. No.: WO96/36093

PCT Pub. Date: Nov. 14, 1996

[30] Foreign Application Priority Data

May 8, 1995 [NO] Norway .................................. 95 1800

[51] Int. Cl.$^6$ ...................................................... H01R 13/73
[52] U.S. Cl. ........................................... 439/551; 439/206
[58] Field of Search ..................... 439/551, 142, 439/205, 206, 559, 556, 680

[56] References Cited

U.S. PATENT DOCUMENTS

| | | | |
|---|---|---|---|
| 4,037,907 | 7/1977 | Klimek et al. | 339/126 |
| 4,793,819 | 12/1988 | Berg | 439/142 |
| 4,822,293 | 4/1989 | Robson | 439/271 |

FOREIGN PATENT DOCUMENTS

| | | | |
|---|---|---|---|
| 0 355 276 | 2/1990 | European Pat. Off. | |
| 4 040 481 | 2/1992 | Germany. | |
| 338630 | 12/1994 | Japan | 439/206 |
| 7-029631 | 1/1995 | Japan. | |

*Primary Examiner*—Gary Paumen
*Assistant Examiner*—Alexander Gilman
*Attorney, Agent, or Firm*—Young & Thompson

[57] ABSTRACT

An appliance inlet for vehicles includes a contact part or plug which can be connected with an appliance cable in the vehicle and a mounting device for mounting the plug on to a mounting surface in the vehicle. The contact part or the plug is attached through a mounting hole in the mounting surface and is locked by a mounting part designed as an internally threaded housing which engages with external threading on a plug housing so that the appliance inlet is rigidly secured to the mounting surface and with its opening substantially in alignment with the outside, the opening being covered with a cap. The interior of the contact section contains contact pins in the plug, and is connected via drainage slots incised in a wall of the contact section through the mounting surface with drainage slots in the mounting housing so that the interior of the contact section is drained to the outside of the appliance inlet. The appliance inlet may receive a socket from an external power source in order to provide charging current or power for the vehicle.

8 Claims, 6 Drawing Sheets

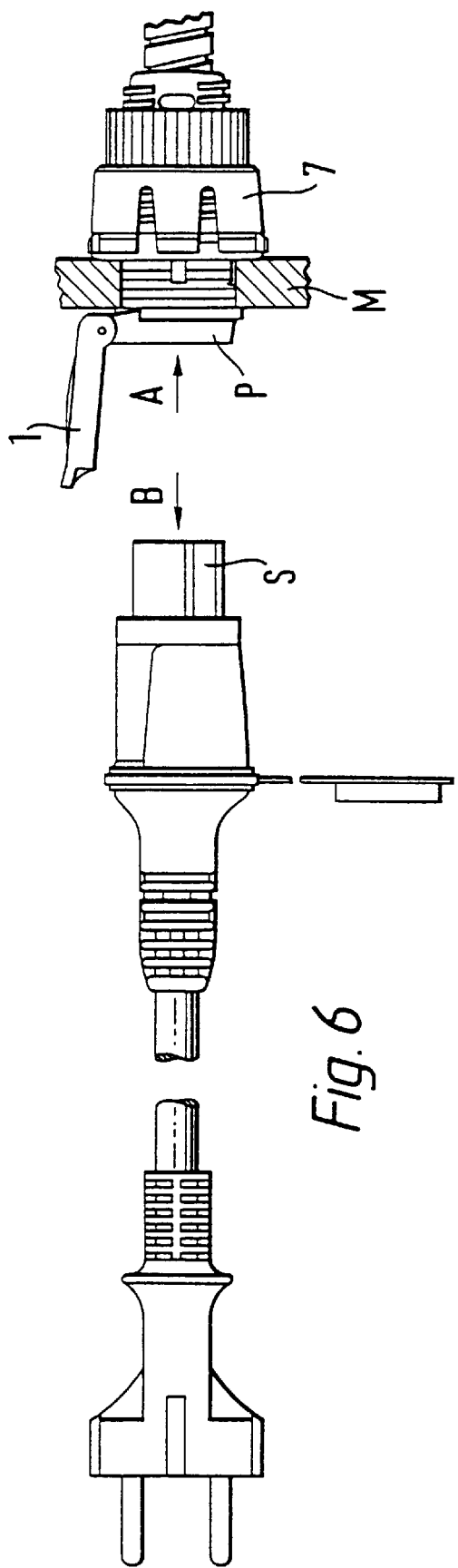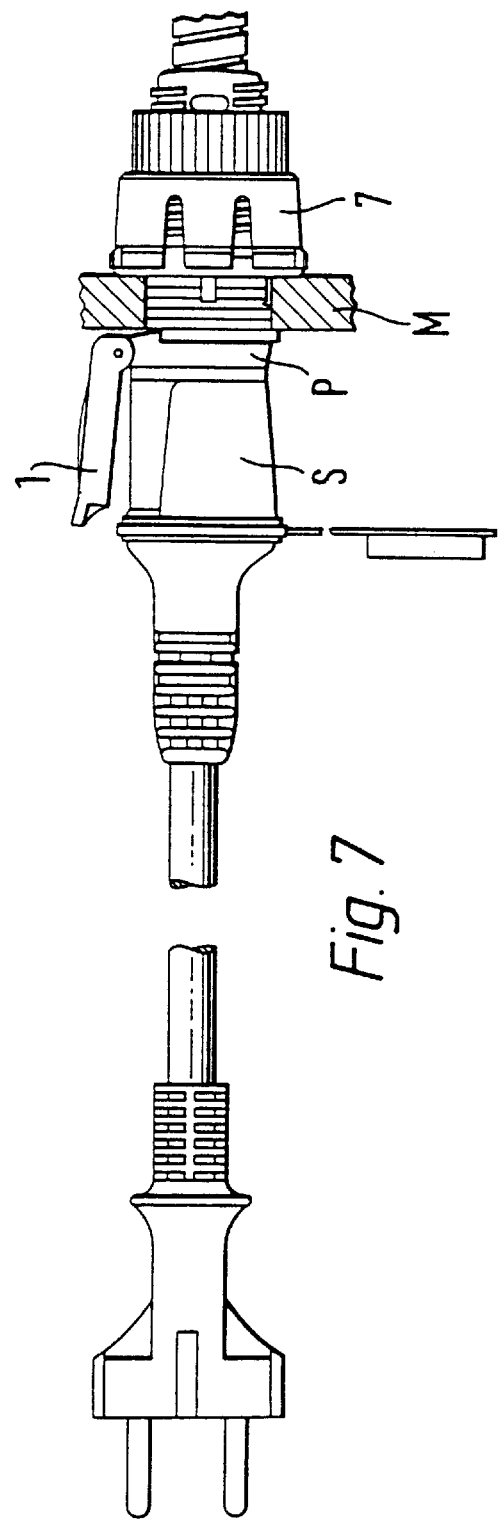

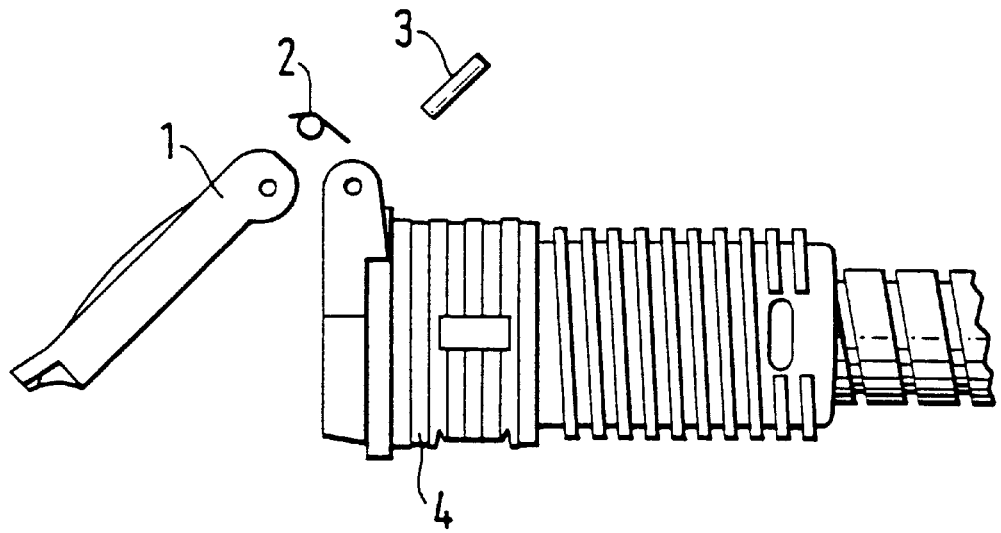
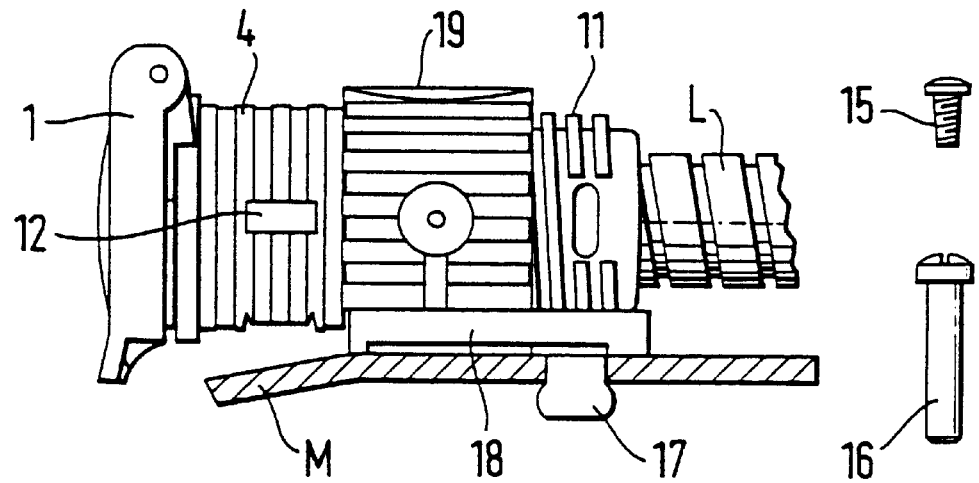
Fig. 9

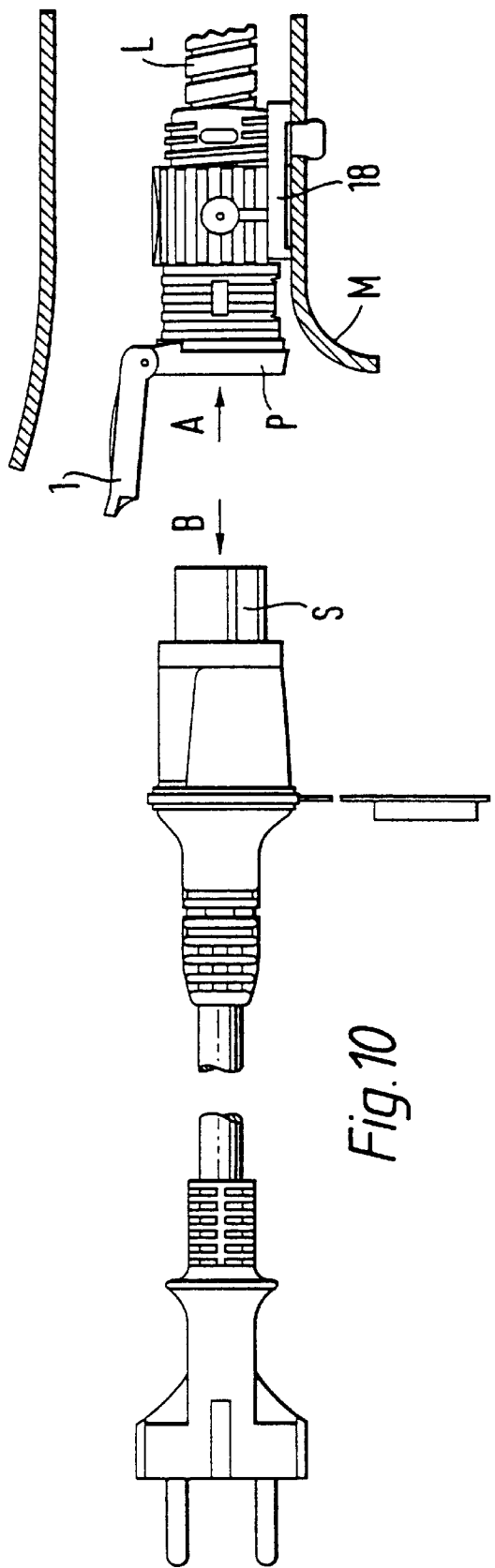
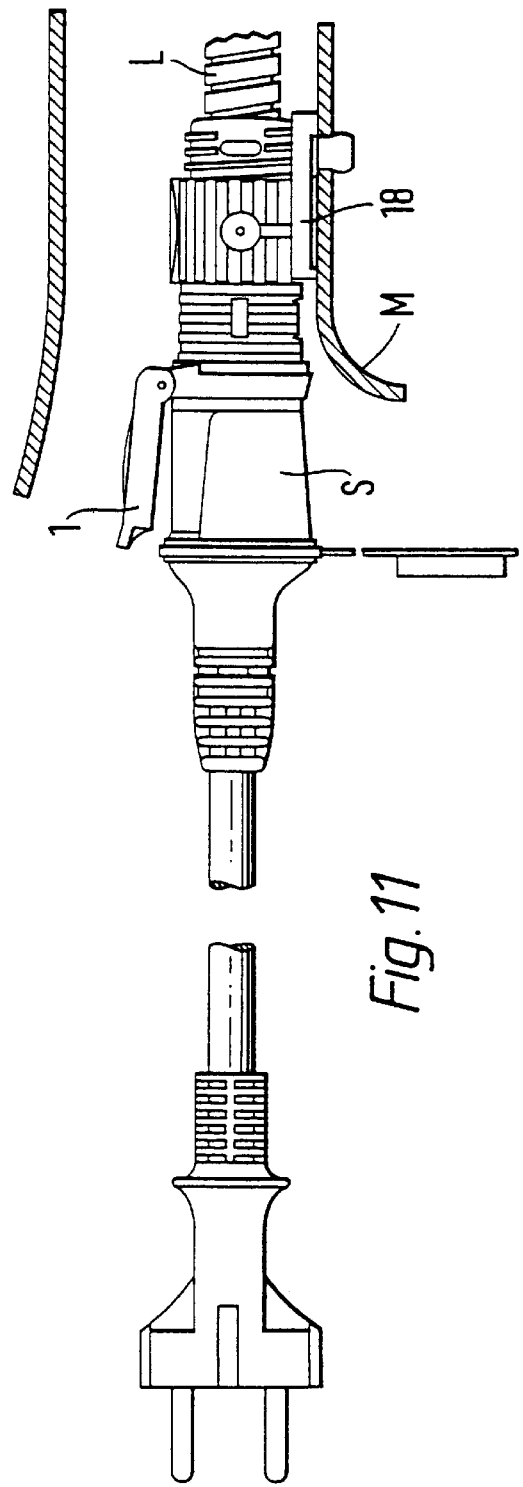
Fig. 10
Fig. 11

APPLIANCE INLET

BACKGROUND OF THE INVENTION

The invention concerns an appliance inlet for vehicles, especially cars, a contact part in the form of a plug arranged to be connected with an appliance cable and a mounting device for mounting the plug on a mounting surface in the vehicle, the plug on the receiver end comprising a contact section in the form of a cavity, wherein in the bottom section of the cavity there are provided contact pins which are cast via cables in a central section formed in one piece with the plug and which can be connected to an engine heater or the vehicle's electrical system, via the appliance cable provided in the vehicle, the contact section being arranged to receive a socket on the contact pins in order to provide connection to an external power source such as the electricity mains, and the contact section's opening on the receiver side being supplied with a watertight, self-closing cap.

The invention also concerns a method for mounting such an appliance inlet.

DESCRIPTION OF RELATED ART

Vehicles, especially cars, are often equipped with an appliance inlet to enable an external power source to be connected when the vehicle is at rest. In particular the appliance inlet is used for the supply of power for battery charging or engine heaters in cars. Such appliance inlets comprise a contact part connected to the appliance cable and are often mounted under the car's bumper by means of a bracket, which, for example, is attached to the bumper. The appliance cable is then attached to the bracket in such a manner that the end of the appliance cable with the contact part, i.e. the plug which has to receive a socket which is connected to the external power source, for example the electricity mains, extends some distance past the contact part. The outermost end of the appliance cable and the contact part are therefore suspended loosely under the car's bumper.

Appliance inlets of this kind have a number of disadvantages. The aesthetic impression created by the actual mounting is not very pleasing and results in the appliance inlet being prone to damage during driving. The mounting can lead to both the contact part and the mounting bracket being damaged, if, e.g., the car drives into snow banks or the like. If, e.g., the cap on the contact part is damaged, salt solution can penetrate into the contact part, which in turn can lead to creeping currents when the contact part is connected to an external power source with a view to supplying charging current or current for the engine heater and the rest of the car's heating system. There is also a danger that the contact part can be damaged if one forgets to disconnect the contact part and the external power supply's socket before driving. The socket will then be torn out of the appliance inlet, which may damage both the contact part and cause the mounting bracket to loosen.

SUMMARY OF THE INVENTION

The object of the present invention is therefore to provide an appliance inlet for the vehicle, especially a car, where the above-mentioned and other drawbacks are avoided. A further object of the invention is to provide a method for mounting an appliance inlet of this kind, with the result that after mounting the appliance inlet is more aesthetic in appearance and at the same time is safeguarded against the possibility of damage both to the contact part, the appliance cable and the mounting device.

These above-mentioned objects are achieved according to the invention with an appliance inlet wherein the plug from the central section on the appliance side comprises an externally threaded housing which receives in its interior, the appliance cable, wherein at the contact section's opening on the receiver side there is provided a circumferential flange, wherein the mounting device comprises a mounting housing with internal threading arranged to be screwed on to the externally threaded housing to abut against the inside of the mounting surface, with the result that the mounting housing and the circumferential flange in abutment against the inside and outside of the mounting surface respectively rigidly secure the appliance inlet on to the mounting surface, and characterized in that in the contact section's wall there are formed one or more elongated, axial drainage slots which extend in the direction of the externally threaded housing and are open towards the plug's outside, and that in the wall of the mounting housing at the end which faces the mounting surface there are formed one or more axial drainage slots, with the result that the contact section via the drainage slot(s) provided in the contact section's wall of the plug is connected with the drainage slot or slots on the mounting housing and thereby drains the cavity in the contact section of the plug to the outside of the appliance inlet.

The method according to the invention is characterized by forming in the contact section's wall one or more elongated, axial drainage slots, by forming one or more axial drainage slots in the wall of the mounting housing at the end which faces the mounting surface, by providing a mounting hole in the mounting surface on the vehicle, by passing the plug through the mounting hole from the outside to abut against a circmferential flange on the plug against the outside of the mounting surface, by connecting the plug with a mounting housing which is screwed over a housing projecting inwardly through the mounting surface on to the plug and to abut against the inside of the mounting surface, the appliance inlet being rigidly secured to the mounting surface with the receiver end of the plug substantially in alignment with the outside of the mounting surface, with the result that, after mounting, one or more drainage slots in the wall in the contact section of the plug extend through the mounting hole into the interior of the mounting housing by means of its abutment against the outside of the mounting surface, whereby the cavity in the contact section of the plug is drained to the outside of the appliance inlet via one or more drainage slots axially incised in the side wall of the mounting housing

BRIEF DESCRIPTION OF THE DRAWINGS

The invention will now be explained in more detail with reference to embodiments and the attached drawing.

FIG. 6 and FIG. 7 illustrate how an appliance inlet according to the invention is connected with the socket of the external power source.

FIG. 9 illustrates an alternative mounting of the appliance inlet according to the invention on a mounting surface in a channel.

FIG. 10 and FIG. 11 illustrate how the appliance inlet mounted as in FIG. 9 is connected with the external power source's socket.

DESCRIPTION OF THE PREFERRED EMBODIMENT

Figure 1:
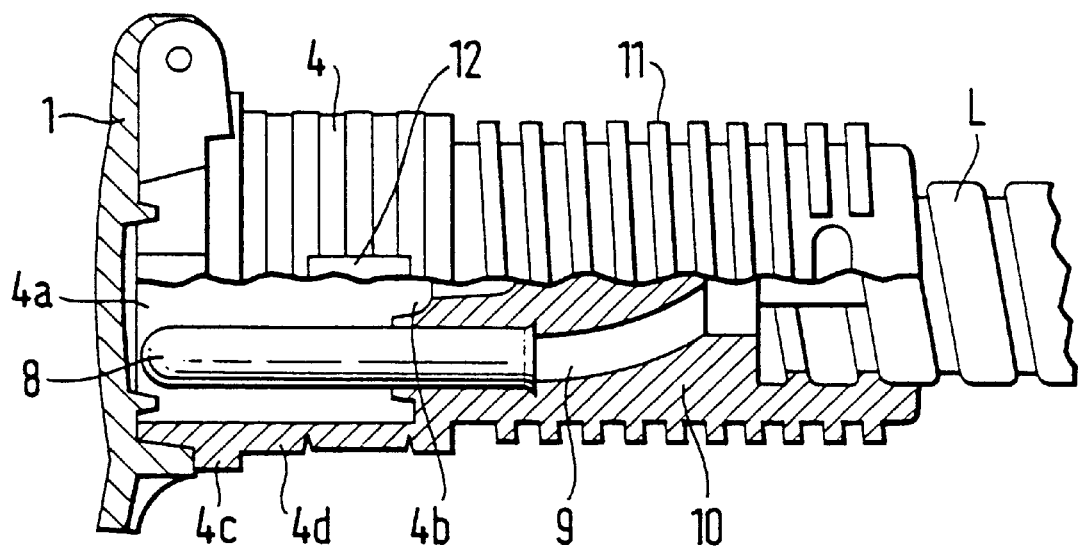
FIG. 1 is a partially cut away view of a plug for an appliance inlet according to the invention.
Figure 2:
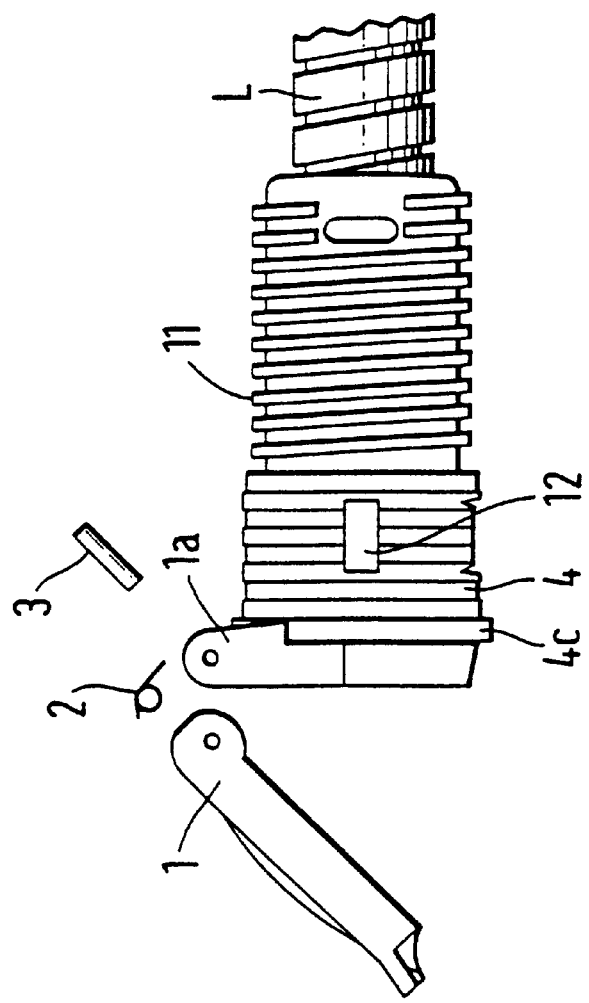
FIG. 2 illustrates various parts of the plug according to the invention.

The appliance inlet according to the invention comprises a contact part P which is illustrated in detail and partially cut away in FIG. 1. The plug P is supplied with a self-closing cap 1 and comprises at a receiver end a contact section 4 and an external threaded section of plug housing 11 which is provided externally with threads and internally receives an appliance cable L. The lower part of the plug P in FIG. 1 is cut away. The contact section 4 is in the form of a cavity 4a which ends in a bottom section 4b. The cavity 4a is surrounded by a wall 4d which is provided at the contact section's 4 opening with a circumferential flange 4c. In the bottom section 4b there are provided contact pins 8 which are cast or embedded in a central section 10 of the plug P and connected to cables 9 which are similarly embedded or cast in this central section. The appliance cable L is inserted into the external threaded housing 11 of this central section 10 where it is connected with the cables 9. One or more axially elongated drainage slots 12 (FIGS. 1–2) are provided in the contact section's wall 4d, thus providing an opening between the cavity 4a and the outside of the contact section 4. These drainage slots 12, which are more clearly illustrated in FIG. 2, extend over the contact section 4 towards the plug housing 11. FIG. 2 illustrates how a self-closing cap 1 is designed and mounted on to the plug on the outside of the circumferential flange 4c. The cap, for example, being attached between upwardly projecting ears 1a connected to the circumferential flange 4c by means of a hinge pin 3. The hinge pin 3 is surrounded by a spring 2 which is extended in such a manner that the cap 1 becomes self-closing and closes the opening in the contact section 4 in a watertight fashion by abutment against the outside of the circumference of this opening.

Figure 3:
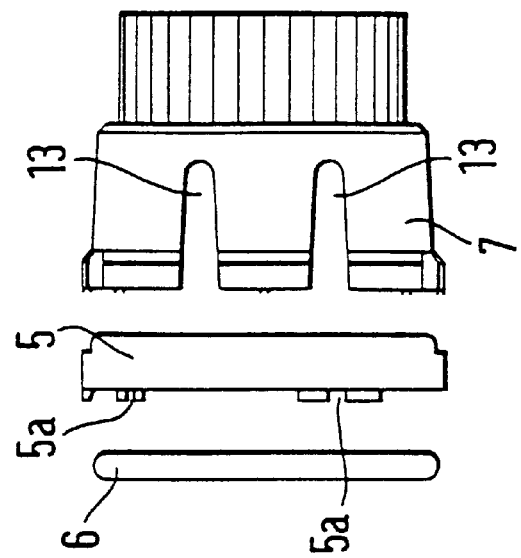
FIG. 3 illustrates a mounting device for an appliance inlet according to the invention.

FIG. 3 shows details of the mounting device for an appliance inlet according to the invention. The mounting device comprises a mounting housing 7 provided with internal, not shown threads and a packing 6, preferably in the form of an O-ring. The mounting device can also, as required, comprise a contact disc 5 provided with contact lugs 5a. In the mounting housing a number of axial drainage slots 13 have been incised which extend from the end of the mounting housing which has to be inserted into the plug P and towards the internal, not shown threaded section of the mounting housing 7.

Figure 4:
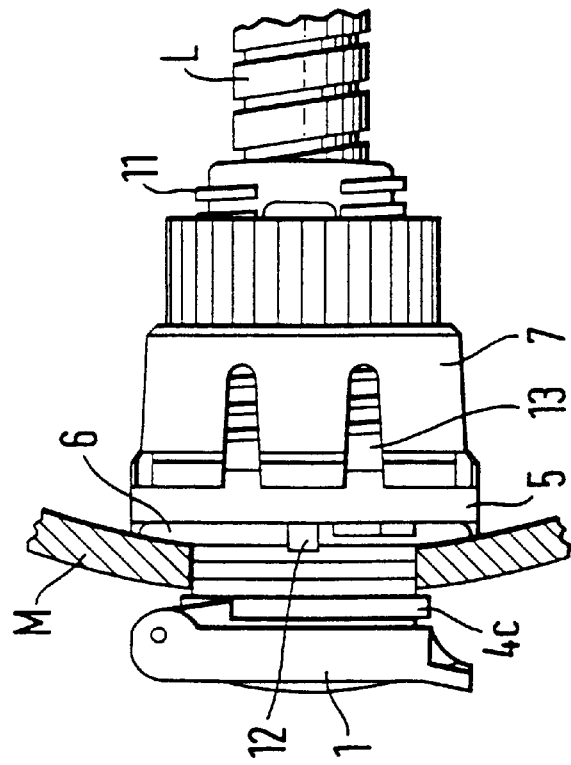
FIG. 4 illustrates an appliance inlet according to the invention mounted on a flat mounting surface.

FIG. 4 illustrates the appliance inlet according to the invention mounted on a flat mounting surface M in a vehicle. In connection with the mounting the mounting surface M is provided with a mounting hole adapted to the diameter of the contact section 4. The plug P is inserted through the mounting hole in such a manner that the circumferential flange 4c abuts against the outside of the mounting surface M. The mounting housing 7 is inserted over the external threaded housing surface M. The packing 6, for example an O-ring, is provided between the mounting housing 7 and the inside of the mounting surface M, thus completely sealing the transition between the mounting surface M and the mounting housing 7. The internal thread in the mounting housing 7 can be provided with a not shown locking lip which ensures that the screw connection between the mounting housing 7 and the plug housing 11 does not loosen. When the appliance inlet is mounted in this manner, it will be rigidly secured to the mounting surface M on the vehicle and the outside of the contact part with the cap 1 will be approximately in alignment with the mounting surface, which not only makes the appliance inlet less prone to damage, but also gives an improved aesthetic impression. It should be understood that the mounting surface M can be any suitable surface whatever on the vehicle, for example in a car the bumper, the grille or a body plate.

Figure 5:
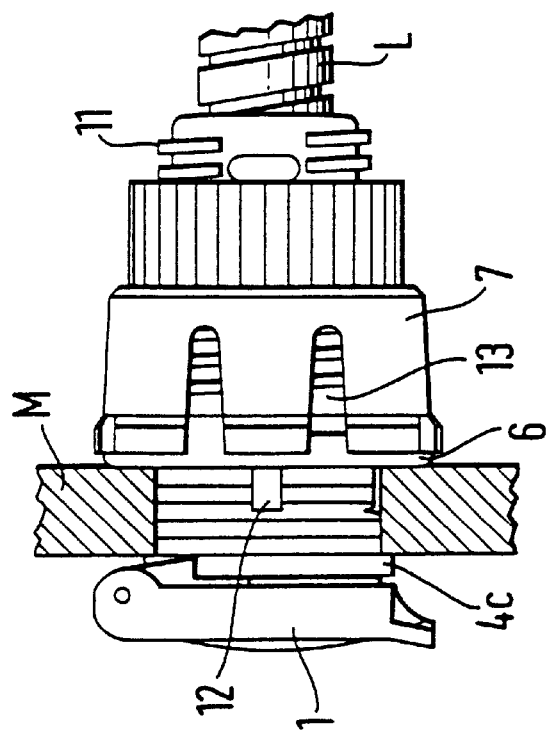
FIG. 5 illustrates an appliance inlet according to the invention mounted on a curved mounting surface.

FIG. 5 shows how an appliance inlet according to the invention can be mounted on a curved mounting surface M. In this case the procedure is the same as when mounting on a flat mounting surface, but between the packing 6 and the mounting housing 7 there is now placed a contact disc 5 provided with a number of contact lugs 5a (FIG. 3) facing the mounting surface M. The contact disc 5 is flexible, with the result that when the mounting housing 7 is locked to the contact part or the plug P it is deformed and provides a secure contact against the inside of the mounting surface M. As before the packing or the O-ring 6 ensures that the connection between the mounting device and the mounting surface is watertight.

When the appliance inlet is mounted as illustrated in FIG. 4 or FIG. 5, the drainage slot or slots 12 in the contact section 4 extend through the mounting hole and into the interior of the mounting housing 7, thus providing an open connection between the drainage slot or slots 12 in the contact section and the drainage slots 13 on the mounting housing 7. Thus the interior of the contact section 4, i.e. the cavity 4a with the contact pins 8, is drained according to regulations to the outside of the appliance inlet.

FIG. 6 and FIG. 7 illustrate how, after mounting, the appliance inlet according to the invention is connected with the socket S and an external power source. The socket S is quite simply inserted into the plug P and it will be seen that if the vehicle is now inadvertently started and begins to move, the socket S will simply be torn out of the appliance inlet without damaging it in any way.

Figure 8A:
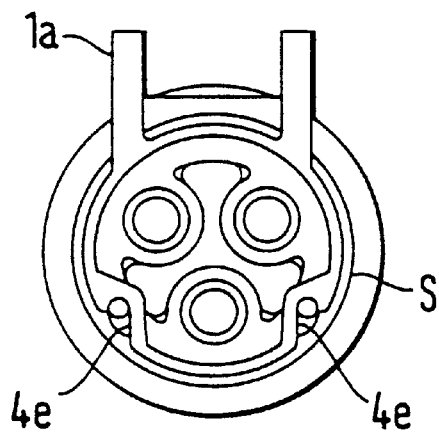
FIGS. 8A–8B illustrates details in the design of the appliance inlet's plug and the power source's socket, viewed from in front.
Figure 8B:
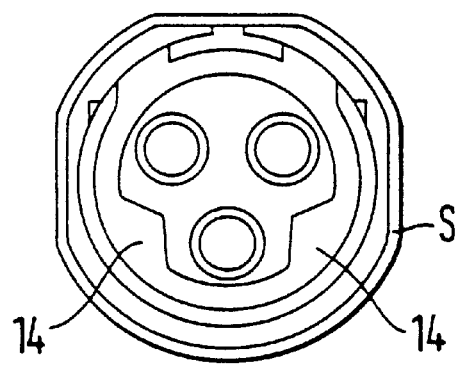

FIGS. 8A–8B are front view of the contact section 4 in the plug P and the corresponding contact section in the socket S respectively. One or more guide ribs 4e on the inside of the contact section 4 engage with corresponding guide grooves 14 in the socket S. FIGS. 8A–8B further illustrate how the mounting lugs 1a for the cap 1 are provided on the outside of the circumferential flange 4c.

The drainage slot or slots 12 in the plug P will basically be advantageously formed as weakened sections in the wall 4d of the contact section 4 and are pressed out or removed in connection with the mounting of the appliance inlet. This also prevents dirt and dust from penetrating into the interior of the contact section 4 before the appliance inlet is mounted.

The actual contact part, i.e. the plug P of the appliance inlet according to the invention, can, however, also be mounted in a more conventional and known per se manner, although this method naturally does not form any part of the actual invention. Thus FIG. 9 shows how, in order to form the appliance inlet, the contact part or the plug P can be mounted on a flat mounting surface M by means of a bracket 18, for example in a channel or the like. In this connection, the bracket 18 with the mounting housing 19 is inserted in towards the center of the external threaded section 11 and is attached to the mounting surface M by means of a fixing screw 16 which is passed through a mounting nut 7 inserted in the mounting surface M. The mounting nut 17 may be in the form of a rubber packing with a metal insert and when the screw 16 is screwed in it will ensure that the bracket is securely attached to the mounting surface M. The bracket 18 is connected to the contact part, i.e. its plug housing 11 by means of locking screws 15 which are passed through the bracket's mounting ring or mounting housing 19. It will be seen that the drainage slots 12 now also drain the interior of the contact section 4 to the outside. This mounting variation also has advantages compared to known methods for mounting appliance inlets, since the contact part is rigidly connected to the mounting surface and in any case can be mounted recessed to such an extent that the appliance inlet is substantially protected from the damage and drawbacks which will arise when mounting is performed in the conventional manner.

FIG. 10 and FIG. 11, like the corresponding FIGS. 6 and 7, illustrate how the socket S from an external power source is connected with the appliance inlet when it is mounted as shown in FIG. 9.

I claim:

1. An appliance inlet for a vehicle comprising:
   a plug serving as a contact part and arranged to be connected with an appliance cable;
   a mounting device connected to said plug for mounting said plug on a mounting surface in the vehicle;
   said plug comprising a receiver end with a contact section in the form of a cavity having a cavity interior, an opening, a wall section, and a bottom section, and a central section contacting and formed in one piece with said bottom section;
   said bottom section comprising contact pins;
   said contact pins being embedded in said central section and comprising cables connectable to the appliance cable so that, via the appliance cable, the contact pins can be connected to an engine heater or the vehicle's electrical system;
   said contact section being arranged to receive a socket, via said opening, and to contact the socket with said contact pins in order to provide an electrical connection via the socket to an external power source;
   said opening comprising a watertight, self-closing cap and a circumferential flange;
   said central section comprising an externally threaded housing and an interior for receiving the appliance cable;
   said mounting device comprising a mounting housing internally threaded and arranged to be screwed on to said externally threaded housing to abut against an inside of the mounting surface so that said mounting housing and said circumferential flange abut against the inside and an outside of the mounting surface respectively to rigidly secure said appliance inlet to the mounting surface;
   said mounting housing comprising a mounting housing wall and a mounting housing axial drainage slot within said mounting housing wall; and
   said wall section comprising an elongated, axial wall section drainage slot extending in the direction of said externally threaded housing and open towards an exterior of said plug,
   wherein a drainage path is provided from said contact section cavity interior via said wall section drainage slot and said mounting housing axial drainage slot to an outside of said appliance inlet at specified thickness of said mounting surface.

2. The appliance inlet of claim 1, wherein said a rearmost thread of said internally threaded mounting housing comprises a locking lip designed and constructed to ensure connection between said mounting housing and said externally threaded housing of said plug.

3. The appliance inlet of claim 1, wherein said mounting housing further comprises a packing.

4. The appliance inlet of claim 3, wherein said packing is an O-ring.

5. The appliance inlet of claim 3, wherein said mounting housing further comprises a contact element in the form of a flexible ring disc with a number of contact lugs designed and constructed for mounting said appliance inlet on a curved mounting surface.

6. The appliance inlet of claim 1, wherein on an interior of said wall section comprises an axial guide rib.

7. A method for mounting an appliance inlet for a vehicle comprising the steps of:
   providing an appliance inlet comprising:
      a plug serving as a contact part and arranged to be connected with an appliance cable;
      a mounting device connected to said plug for mounting said plug on a mounting surface in the vehicle;
      said plug comprising a receiver end with a contact section in the form of a cavity having a cavity interior, an opening, a wall section, and a bottom section, and a central section contacting and formed in one piece with said bottom section;
      said bottom section comprising contact pins;
      said contact pins being embedded in said central section and comprising cables connectable to the appliance cable so that, via the appliance cable, the contact pins can be connected to an engine heater or the vehicle's electrical system;
      said contact section being arranged to receive a socket, via said opening, and to contact the socket with said contact pins in order to provide an electrical connection via the socket to an external power source;
      said opening comprising a watertight, self-closing cap and a circumferential flange;
      said central section comprising an externally threaded housing and an interior for receiving the appliance cable;
   said mounting device comprising a mounting housing internally threaded and arranged to be screwed on to said externally threaded housing to abut against an inside of the mounting surface so that said mounting housing and said circumferential flange abut against the inside and an outside of the mounting surface respectively to rigidly secure said appliance inlet to the mounting surface; and
   said mounting housing comprising a mounting housing wall;
   forming in said mounting housing wall a mounting housing axial drainage slot within said mounting housing wall;
   forming in said wall section an elongated, axial wall section drainage slot extending in the direction of said externally threaded housing and open towards an exterior of said plug;
   providing a mounting hole in the mounting surface;
   passing said plug through the mounting hole to abut against the circumferential flange against the outside of the mounting surface;
   connecting said plug and said mounting housing by screwing said mounting housing over said externally threaded housing to abut against an inside of the mounting surface and to rigidly secure said appliance inlet to the mounting surface with said receiver end of said plug substantially in alignment with the outside of the mounting surface, wherein a drainage path is provided from said contact section cavity interior via said wall section drainage slot and said mounting housing axial drainage slot to an outside of said appliance inlet.

8. The method of claim 7, further comprising the step of providing to said mounting housing a contact element in the form of a flexible ring disc with a number of contact lugs, and facing the contact lugs against the mounting surface between the inside of the mounting surface and said mounting housing.

* * * * *